United States Patent [19]

Saint-Louis Augustin et al.

[11] Patent Number: 5,005,317

[45] Date of Patent: Apr. 9, 1991

[54] BOTTOM WIPER SEAL FOR A RETRACTABLE CAR WINDOW

[75] Inventors: Guy Saint-Louis Augustin, Montargis; Henri Guillon, Vaux sur Seine, both of France

[73] Assignee: Hutchinson, Paris, France

[21] Appl. No.: 372,876

[22] Filed: Jun. 28, 1989

[30] Foreign Application Priority Data

Jun. 29, 1988 [FR] France .................. 88 08728

[51] Int. Cl.⁵ .......................................... E06B 7/16
[52] U.S. Cl. ....................................... 49/495; 49/377; 49/491; 49/496
[58] Field of Search ............... 49/495, 377, 490, 491, 49/502, 374, 496, 485, 475

[56] References Cited

U.S. PATENT DOCUMENTS

| | | | |
|---|---|---|---|
| 3,742,649 | 7/1973 | Dochnahl | 49/491 X |
| 4,424,647 | 1/1984 | Sasaki et al. | 49/502 |
| 4,442,156 | 4/1984 | Yamaguchi | 49/475 X |
| 4,481,736 | 11/1984 | Norton | 49/495 X |
| 4,606,149 | 8/1986 | Hamada et al. | 49/377 X |
| 4,696,128 | 9/1987 | Fukuhara | 49/377 X |
| 4,785,582 | 11/1988 | Tokue et al. | 49/374 X |

FOREIGN PATENT DOCUMENTS

| | | |
|---|---|---|
| 0021989 | 1/1981 | European Pat. Off. . |
| 070165 | 1/1983 | European Pat. Off. . |
| 2468717 | 5/1981 | France . |
| 2127713 | 4/1984 | United Kingdom . |

*Primary Examiner*—Philip C. Kannan
*Attorney, Agent, or Firm*—Jacobs & Jacobs

[57] ABSTRACT

A bottom wiper seal for a moving glass, in particular in a car door, the wiper seal comprising a stub or clamp for fixing and mounting on the frame of the door and a first sealing lip carried by the stub and suitable for co-operating with the window glass. The wiper seal further comprises a second lip which is offset downwards relative to the first, and which is shaped and placed in such a manner as to come into contact with the window glass only when the glass is fully extended, in which case the second lip bears sufficiently against the glass for the lip to provide satisfactory sealing, with the first lip being covered on portions thereof liable to come into contact with the window by means of a relatively flexible covering of flock, whereas the second lip is coated on its operative portion with a sliding coating.

9 Claims, 2 Drawing Sheets

BOTTOM WIPER SEAL FOR A RETRACTABLE CAR WINDOW

The invention relates to a bottom wiper seal for the moving glass of a retractable car window.

BACKGROUND OF THE INVENTION

There already exist numerous varieties of weather strip for sealing the glass or pane of a car window, such stripe being fixed around the window frame in a vehicle door and being referred to herein as "slides" when they line the top and sides of an opening suitable for being opened or closed by a moving retractable sheet of glass, and as "bottom wiper seals" or "wiper seals" when they are provided along the bottom edge of such an opening. Although wiper seals, and indeed slides, are required to provide adequate sealing against water, and also to contribute to providing sound insulation, they also serve to provide outer functions. Thus, slides also act as guide members and as protection members, unlike wiper seals, whereas wiper seals contribute to the appearance of the vehicle and are required also to project as little as possible from the opening in the door.

In order to satisfy this condition, car manufacturers desire that the sealing lip, i.e. the operative portion per se of the wiper seal should extend as closely as possible perpendicularly to the moving glass.

The solutions provided to this problem in the prior art have given rise to weather strips which are available on the market and which include one or two sealing lips made of natural or synthetic rubber carried on a stub optionally including reinforcement, with the lip(s) bearing and deforming against the moving surface.

However, since having such a lip bearing against the glass tends to slow down the sliding of the glass, proposals have been made to cover the surface of the lip which comes into contact with the glass in a layer having good sliding properties.

To this end, the sealing lips of some retractable window wiper seals are covered with a layer of flock comprising textile strands or fibers constituting a covering which is somewhat analogous to velvet. Although sliding properties are improved thereby, lips treated in this way nevertheless loose these qualities fairly rapidly, in particular because of their relatively rapid rate of wear. These lips have therefore been replaced by lips coated with a smooth sliding coating made of polyolefin, polytetrafluoroethylen, or other material (generally a synthetic material) which withstands friction wear wall and which provides good sealing against both air and water, while nevertheless having good sliding properties. Unfortunately, this solution is not entirely satisfactorily since it increases the danger of the glass being scratched by dust, which risk is further increased due to the transverse displacement of the glass while it is being raised or lowered because of the somewhat bulging shape given to the doors and windows in many recent models.

Consequently, an object of the invention is to provide a wiper seal for wiping the bottom of a moving motor vehicle window glass, which viper seal is simple and cheap to make while nevertheless obtaining good sealing against water and good sound isolation while avoiding damaging the glass or window with which it cooperates.

SUMMARY OF THE INVENTION

To achieve this object and solve the problem posed, the invention takes advantage of the above-mentioned transverse displacement of sliding window glasses (assumed to slide vertically in the discussion below) which means that level with the wiper seal the position of the glass relative to a reference plane parallel to a plane in the door varies through several millimeters depending on the height of glass extending from the door.

According to the invention, the problem is solved in a bottom wiper seal for a retractable window glass, the wiper seal comprising a stub or clamp for mounting and fixing on a door frame and a first sealing lip carried by said stub suitable for co-operating with said glass, by the facts that:

the wiper seal further comprises a second lip offset relative to the first towards the inside end of the glass, i.e. situated beneath the first lip in the most common case of a window which slides substantially vertically, said second lip being shaped and placed in such a manner as to make contact with the glass only when the glass is fully extended in which case it bears thereagainst sufficiently to provide satisfactory sealing; and the first lip is covered on its portion liable to make contact with the window by means of a relatively flexible covering of flock whereas the second lip is provided on its operative portion with a sliding coating of the polyolefin, polytetrafluoroethylene, etc. ... type, or the like.

In this wipe seal, the flocked top lip provides sealing for the entire extending portion of the window while the window is being moved, and the geometry of this lip is selected in such a manner as to exert minimal force on the window; it thus satisfies requirements for good appearance, and it retains dust and prevents it from penetrating into the door, while the bottom lip which is shorter or more steeply sloping than the first, or both shorter and more steeply sloping and it has a sliding coating that makes contact with the window only when it is fully raised, and therefore does not run any danger of scratching visible portions thereof, with the distance between the ends of the lips being determined as a function of the above-mentioned transverse displacement so that the bottom lip bears against the window only when the window is fully extended, i.e. it only ever bears against the bottom portion of the glass which is always hidden. By combining these two lips, one of which is covered in flock and the other of which has a sliding coating, it is possible to obtain good sealing against air and water without running any danger of ugly scratches and while requiring only low levels of sliding force.

In an advantageous embodiment, both of the lips are mounted on a clamp or stub which is generally n-shaped, which optionally includes reinforcement, and which is provided with claws for fastening the wiper seal onto the bodywork as described in the present Assignee's French patent application number 88.02523 filed Mar. 1, 1988, which the top lip being connected via its base to the web of the stub while the bottom lip is connected via its base to the end of one of the flanges of said stub.

Also advantageously, the bottom lip may be tubular in shape with a fractioned sliding coating, thereby providing greater flexibility without reducing its sealing qualities.

In one embodiment of the invention, the lips and the stub are made of materials having different degrees of resilience and of hardness, with the lips being more deformable than the stub so as to provide better sealing, and with the zones 40 where the lips meet the stub being optionally even more elastically deformable than the lips per se.

The sliding coating is advantageously applied to the bottom lip during manufacture of the wiper seal by co-extruding elastomers and/or plastomers, such as rubber or PVC or a thermoplastic material.

In a variant, the sliding coating is made by soaking or by spraying, optionally using masks or pretreatment to obtain zones which are not to be coated in order to obtain a uniform layer having zones or reduced thickness in order to increase the flexibility of the assembly as a whole.

In a first embodiment of the invention, both lips are made of a material having the same degree of deformability.

In a different embodiment of the invention, the lips are made of materials having differing degrees of deformability.

BRIEF DESCRIPTION OF THE DRAWING

An embodiment of the invention is described by way of example with reference to the accompanying drawing, in which.

DETAILED DESCRIPTION

Figure 2:
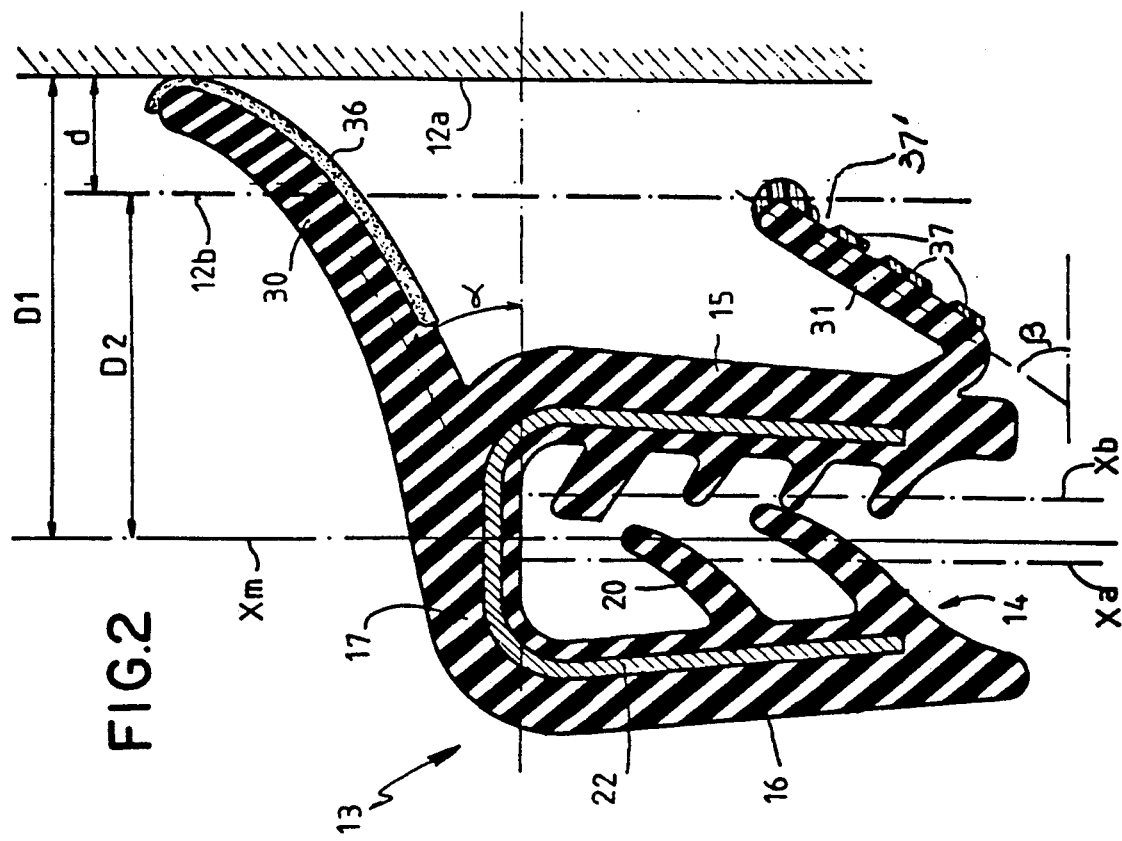
FIG. 2 is a cross-section through a wiper seal in accordance with the invention.
Figure 1:
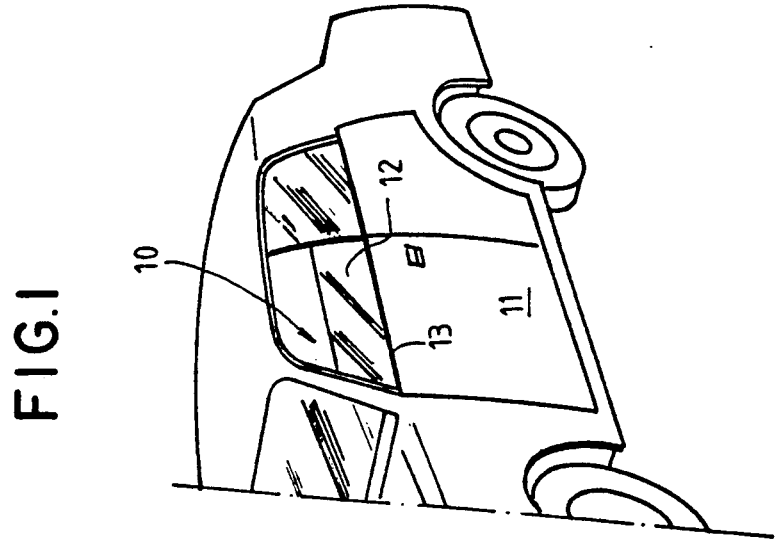
FIG. 1 is a fragmentary perspective view showing a portion of the bodywork of a car.
Figure 3:
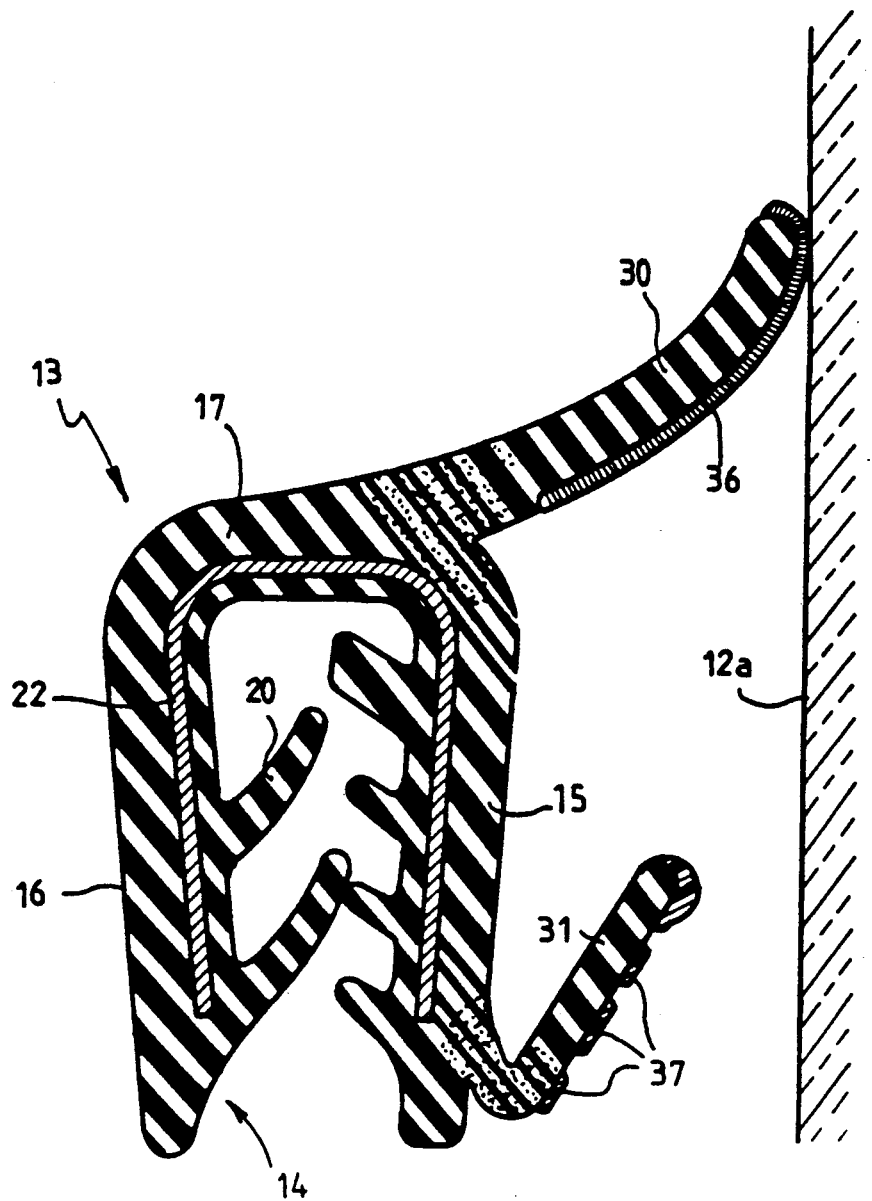
FIG. 3 is a cross section through a wiper seal in accordance with the invention and shows zones of greater elasticity.

The wipe seal is installed along the bottom of an opening 10 in the door 11 of a car, said opening being suitable for being closed by a sliding window glass 12 (see FIG. 11), said window glass being guided along its edges by slideways (not shown), and being suitable for engaging a top slideway extending substantially parallel to the wiper seal 13. The wiper seal is essentially constituted by a clamp or stub 14 whose cross-section is generally $\pi$-shaped (FIG. 2), having substantially parallel flanges 15 and 16 interconnected by a web 17, with the inside faces of the flanges 18 and 19 having projections or ribs such as 20 and 21 for fixing to the frame of the door 11 (not shown). In the embodiment described and shown in the drawings, the stub 14 is reinforced by a channel section member 22 advantageously made of metal, e.g. aluminum, and embedded within the bulk of the material constituting the wiper seal, said material being an elastomer material such as a rubber, a plastomer material such as PVC, or a thermoplastic elastomer material.

The invention also extends to making the wiper seal out of a plurality of different materials which differ from one another in various properties, e.g. hardness, with the clamp or stub 14 then preferably being made of a material which is harder than the material used for the sealing lips.

In accordance with the invention, the clamp or stub 14 is associated with two sealing lips 30 and 31, with the base 32 of the first or top lip being connected to the web 17 of the stub, while the base 33 of the second or bottom lip is connected to the flange 15 of the stub. The top lip 30 has its free end and its underside covered in flock to constitute a flexible covering 36 facilitating sliding and retaining dust, said covering extending substantially orthogonally to the glass 12 when the glass closed the opening 10, and the length of said covering being such as to make contact with the face 12a of the glass 12 whenever the glass closes the opening 10 either totally or in part, with the means plane A of the top lip 30 forming a relatively small angle $\alpha$ with the mean plane B of the web 17 whenever the lip engages the glass.

In FIG. 2, references 12a and 12b designate that face of the glass which faces the wiper seal firstly when the window is fully lowered and secondly when the window is fully extended, with the distances D1 and D2 (which differ by gap d) representing the distances of the glass from the axis X of the stub in said two positions respectively, while axes Xa and Xb indicate the positions of the axis of the drive mechanism corresponding to the positions referenced 12a and 12b, with Xm representing the means position of said axis. For plane sheets of glass, the distance between Xa and Xb is equal to the distance b between the two extreme positions of the window, which is shown as being plane in order to simplify the drawing, but which could also be curved to a small extent.

The bottom lip 31 has its free end and its bottom face coated with a sliding coating 37 which is interrupted by gaps 37', which coating is preferably made of a plastic material having a low coefficient of friction, e.g. a polyolefin or polytetrafluoroethylene. The length and the positions of the coating are such as to ensure that it does not come into contact with the window except when the surface of the window directed towards the wiper seal is in its position 12b, i.e. when the window is fully extended. Thus, in this example, the lip 31 is both shorter than the lip 30 and has a mean axis which makes an angle $\beta$ relative to the mean axis B of the web of the stub, which angle $\beta$ is much greater than the angle $\alpha$ made by the top lip 30. The angle $\beta$ and the length of the bottom lip 31 are chosen in such a manner as to ensure that this lip exerts relatively low pressure on the glass but nevertheless exerts sufficient pressure to ensure sealing when the glass is fully extended, while avoiding any risk of the lip making contact with the glass in any position other than the fully extended position.

Advantageously, but not exclusively, the lips 30 and 31 are both made of a material which is more flexible than the material used for the stub, in which case the fastening claws 20 and 21 are also preferably made of a material which is more flexible than that used for the web 17 and the flanges 15 and 16.

The body of the stub 14 is preferably made of a material which is harder than that used for the projections or webs 20 and 21, and harder than the active portions of the lips which must be sufficiently flexible to accommodate possible defects in the planeness of the window or to take account of the deliberately curved shape thereof.

We claim:

1. In a bottom wiper seal for a moving glass which comprises a stub or clamp for securing the bottom wiper seal on the frame of a door and a first sealing lip which cooperates with the moving glass carried by the stub or clamp, the first sealing lip being covered on portions liable to come into contact with the glass by means of a relatively flexible covering of flock, the improvement which comprises a second lip connected to the stub or clamp which is offset downwards relative to the first sealing lip and which is shaped and disposed so as to contact the moving glass only when the glass is fully extended, the second lip bearing sufficiently against the moving glass to provide a satisfactory seal and the second lip having a coating on its operative portion which facilitates sliding and the second lip is connected to the stub via a zone of greater elasticity than the second lip.

2. The improvement according to claim 1, wherein the second lip is shorter than the first lip.

3. The improvement according to claim 1, wherein the second lip is directed in such a manner as to make an angle $\beta$ relative to a direction perpendicular to the window which is greater than the corresponding angle $\alpha$ made by the first lip.

4. The improvement according to claim 1, wherein the second lip is both shorter than the first lip and slopes at a greater angle than the first lip relative to the direction towards the window.

5. The improvement according to claim 1, wherein the coating of the second lip is discontinuous.

6. In a bottom wiper seal for a moving glass which comprises a stub or clamp for securing the bottom wiper seal on the frame of a door and a first sealing lip which cooperates with the moving glass carried by the stub or clamp, the first sealing lip being covered on portions liable to come into contact with the glass by means of a relatively flexible covering of flock, the improvement which comprises a second lip connected to the stub or clamp which is offset downwards relative to the first sealing lip and which is shaped and disposed so as to contact the moving glass only when the glass is fully extended, the second lip bearing sufficiently against the moving glass to provide a satisfactory seal and the second lip having a coating on its operative portion which facilitates sliding and the first lip is connected to the stub or clamp via a zone of greater elasticity than the first lip.

7. In a bottom wiper seal for a moving glass which comprises a stub or clamp for securing the bottom wiper seal on the frame of a door and a first sealing lip which cooperates with the moving glass carried by the stub or clamp, the first sealing lip being covered on portions liable to come into contact with the glass by means of a relatively flexible covering of flock, the improvement which comprises a second lip connected to the stub or clamp which is offset downwards relative to the first sealing lip and which is shaped and disposed so as to contact the moving glass only when the glass is fully extended, the second lip bearing sufficiently against the moving glass to provide a satisfactory seal and the second lip having a coating on its operative portion which facilitates sliding and the coating of the second lip is produced by coextrusion on the second lip with the wiper seal.

8. In a bottom wiper seal for a moving glass which comprises a stub or clamp for securing the bottom wiper seal on the frame of a door and a first sealing lip which cooperates with the moving glass carried by the stub or clamp, the first sealing lip being covered on portions liable to come into contact with the glass by means of a relatively flexible covering of flock, the improvement which comprises a second lip connected to the stub or clamp which is offset downwards relative to the first sealing lip and which is shaped and disposed so as to contact the moving glass only when the glass is fully extended, the second lip bearing sufficiently against the moving glass to provide a satisfactory seal and the second lip having a coating on its operative portion which facilitates sliding and the coating of the second lip is discontinuous.

9. In a bottom wiper seal for a moving glass which comprises a stub or clamp for securing the bottom wiper seal on the frame of a door and a first sealing lip which cooperates with the moving glass carried by the stub or clamp, the first sealing lip being covered on portions liable to come into contact with the glass by means of a relatively flexible covering of flock, the improvement which comprises a second lip connected to the stub or clamp which is offset downwards relative to the first sealing lip and which is shaped and disposed so as to contact the moving glass only when the glass is fully extended, the second lip bearing sufficiently against the moving glass to provide a satisfactory seal and the second lip having a discontinuous coating on its operative portion which facilitates sliding and the discontinuous coating is provided by a method selected from the group consisting of soaking, spraying through a mask and spraying after pretreatment of uncoated zones.

* * * * *